J. C. Loveland,
Dough Kneader,
N° 52,062. Patented Jan. 16, 1866.
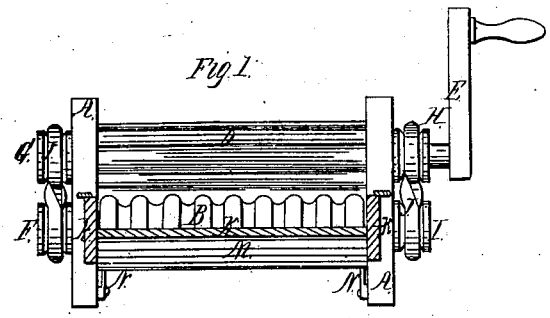
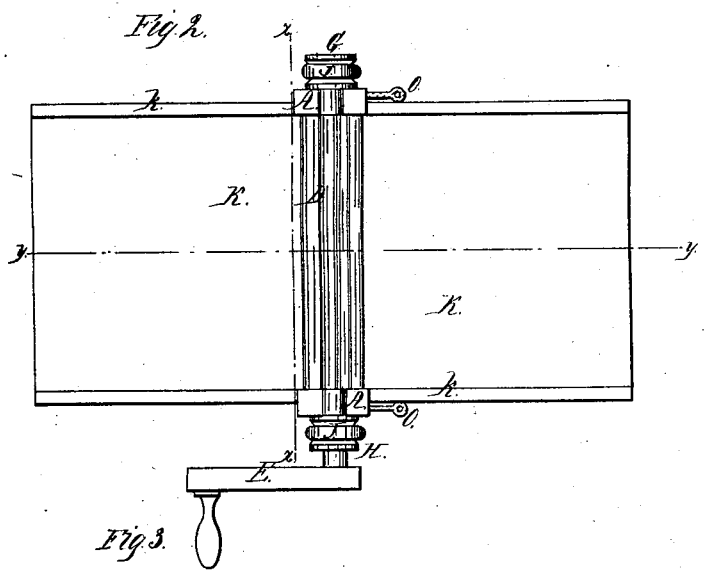
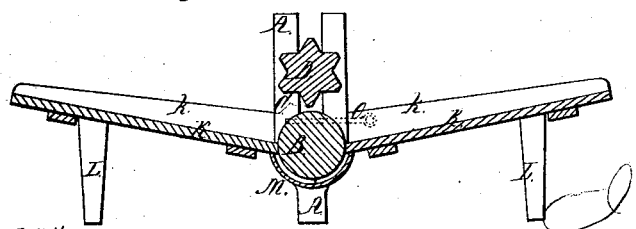
Witnesses:
Inventor:
C. Loveland
Munn & Co.
Attorneys.

UNITED STATES PATENT OFFICE.

JOHN C. LOVELAND, OF SPRINGFIELD, VERMONT.

DOUGH-KNEADER.

Specification forming part of Letters Patent No. 52,062, dated January 16, 1866.

*To all whom it may concern:*

Be it known that I, JOHN C. LOVELAND, of Springfield, in the county of Windsor and State of Vermont, have invented a new and useful Improvement in Pastry-Kneader and Kitchen-Helper; and I do hereby declare that the following is a full, clear, and exact description thereof, which will enable others skilled in the art to make and use the same, reference being had to the accompanying drawings, forming part of this specification, in which—

Figure 1 is a vertical cross-section through the line $x\,x$, Fig. 2. Fig. 2 is a plan or top view of my improved pastry-kneader. Fig. 3 is a vertical longitudinal section through the line $y\,y$, Fig. 2.

Similar letters of reference indicate like parts.

My invention has for its object the furnishing a machine for kneading dough for pastry, bread, &c.; and it consists in combining a pair of rollers with each other and with the frame in which they work, and in combining with said rollers a pair of inclined tables or aprons, and also in combining with said rollers and tables a dish for receiving the flour or dough that may be carried by the rollers to the under side of the table, as hereinafter more fully described.

A are the frames or supports in which are formed the bearings of the rollers, and to which the lower or inner ends of the inclined tables or aprons are attached. The upper parts of the supports A are slotted, as represented in Figs. 1 and 2, and in the lower part of these slots revolve the journals of the roller B. Upon the journals of the roller B, within the slots of the supports A, are placed blocks, one of which is seen at C, Fig. 3. Upon the upper ends of said blocks C revolve the journals of the roller D, said blocks being so long as to keep the rollers B and D at any required distance apart.

E is a crank attached to the projecting end of the axle of the roller D, and by which motion is communicated to the said roller D.

Upon the ends of the axles of the rollers B and D are formed pulleys F G H I. The pulleys at each end of the machine are connected by crossed rubber bands, by which motion is communicated from the roller D to the roller B. The roller D is grooved or channeled longitudinally, as shown, but the roller B is grooved or creased laterally, by which difference of form in the two rollers the dough is more thoroughly broken up and commingled or kneaded.

To the sides of the frame or supports A is attached the frame $k$ of the tables or aprons K, the outer ends of said aprons being supported by feet L, attached to the frame-work $k$ of said aprons. For convenience the aprons K are made slightly inclined toward the rollers, as shown in Fig. 3, and their lower edges are scalloped, so as to fit into the grooves or creases in the roller B. By this means a less amount of flour or dough will be able to find its way between the roller and aprons to the lower part of the machine; but whatever does find its way through is caught by the dish M, which is a dish made in the form represented in Fig. 3, placed beneath the roller B, its edges resting against the lower surface of the aprons, as shown, and its ends against the supports A; and it is held in place by the buttons N, attached to the supports A and shutting up against the lower part of said dish, by turning which buttons the dish M may be removed and emptied as often as may be necessary.

In using the machine the dough to be kneaded is placed on one of the aprons K, a portion of the dough being in contact with the rollers B and D. Then, by the revolution of the rollers, the whole mass is drawn through between the rollers and deposited on the other apron. Then it may be doubled up, and by reversing the motion of the rollers it will be drawn back to the first apron, and the operation continued until the dough is thoroughly kneaded, the elasticity of the bands J allowing the space between the rollers to be increased when a thicker or stiffer portion of the dough is passing through.

It will be observed that the rollers are held in place by the pins O passing through the supports A and into the block C, these holes and pins being so arranged that the pins will fit whatever way the rollers may be placed in the slots. This allows the rollers to be attached to the machine with the crank on whichever side convenience may require.

By removing the corrugated rollers B and D and substituting a pair of plain rollers, the machine may be used for rolling out pie-crust and other pastry that requires to be rolled into thin sheets, and by varying the length of the blocks C the thickness of the sheets of dough may be varied at pleasure.

I claim as new and desire to secure by Letters Patent—

1. The combination of the rollers B and D, constructed as described, with each other and with the frame A, substantially as described, and for the purpose set forth.

2. The combination of the inclined aprons or tables K with the rollers B and D and with the frame or supports A, substantially as described, and for the purpose set forth.

3. The combination of the dish M with the roller B, the aprons K, and the supports A, substantially as described, and for the purpose set forth.

The above specification of my invention signed by me this 21st day of November, 1865.

JOHN C. LOVELAND.

Witnesses:
M. M. LIVINGSTON,
JAMES T. GRAHAM.